Feb. 13, 1934.  W. S. GRAHAM ET AL  1,946,686
LISTER CULTIVATOR ATTACHMENT
Filed April 28, 1933   2 Sheets-Sheet 1

Inventors
William S. Graham
and Glen J. Olson
By
Atty.

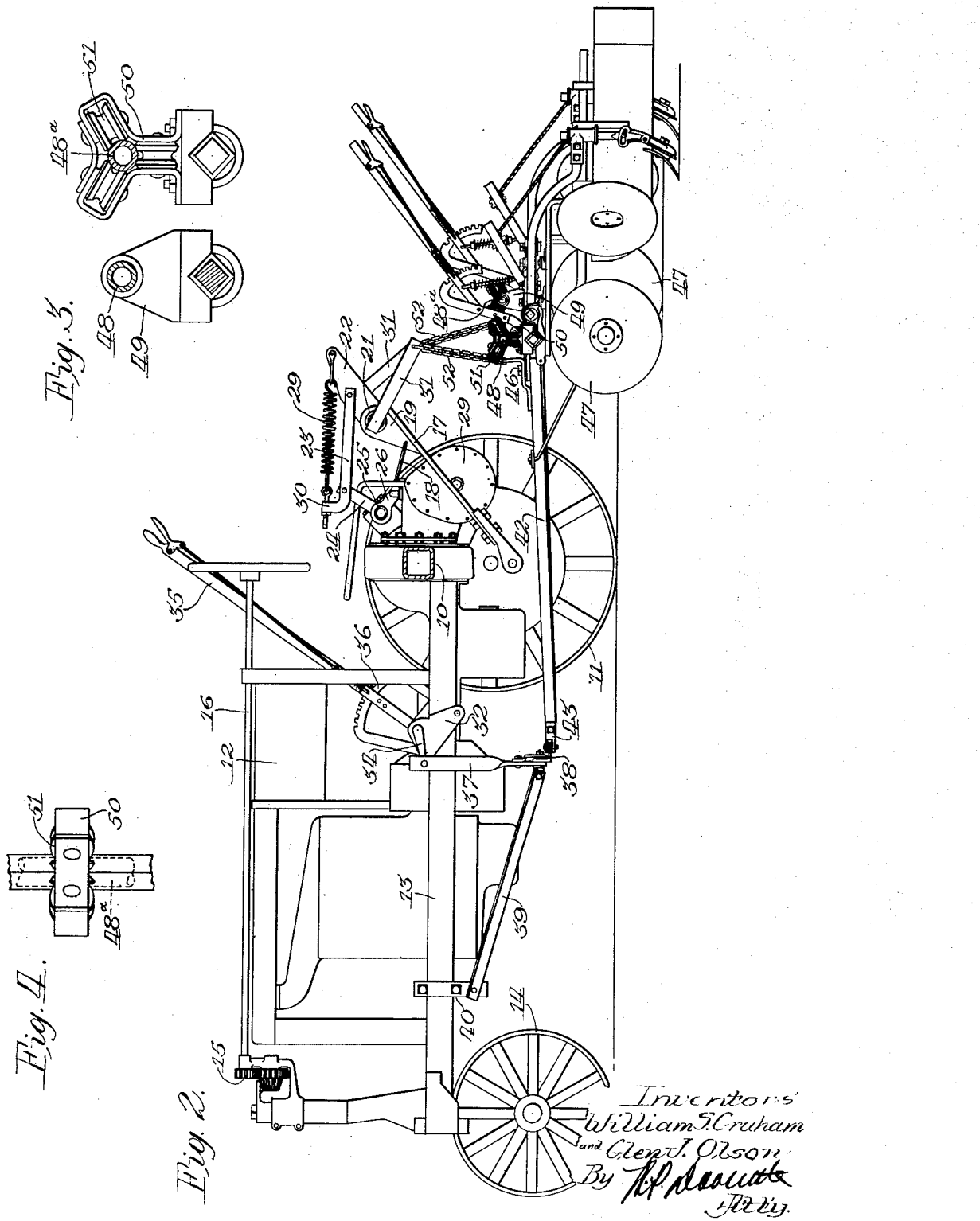

Patented Feb. 13, 1934

1,946,686

UNITED STATES PATENT OFFICE 1,946,686

LISTER CULTIVATOR ATTACHMENT

William S. Graham and Glen J. Olson, Canton, Ill., assignors to International Harvester Company, a corporation of New Jersey Application April 28, 1933. Serial No. 668,328

6 Claims. (Cl. 97—47)

The present invention relates to earth working implements in connection with tractors and, more specifically, to the construction and manner of connection of lister cultivators to row crop tractors.

The principal objects of the invention are to provide a lister cultivator attachment for tractors capable of operating on four rows or plant furrows at each traverse of the machine, and to so construct the cultivator that the several units thereof can automatically accommodate themselves to the variations usually present in row spacings, be prevented from tipping laterally and be held in proper longitudinal position parallel to the line of travel.

A further object is to provide a structure for connecting a four row lister cultivator to a row crop tractor of the wide tread type that will provide a forward hitch point for the lister units, to effect close coupling thereof and permit power lift mechanism on the tractor to be employed to simultaneouly raise and lower all of the lister cultivator units.

The foregoing, as well as other objects and advantages, are embodied in the construction and organization hereinafter described in detail and illustrated in the accompanying drawings, where:

Figure 2 is a side elevation of the organization shown in Figure 1;

Figure 3 is a detail sectional view taken on the line 3—3 of Figure 1; and,

Figure 4 is a plan view of the roller bracket seen in Figure 3.

Figure 1:
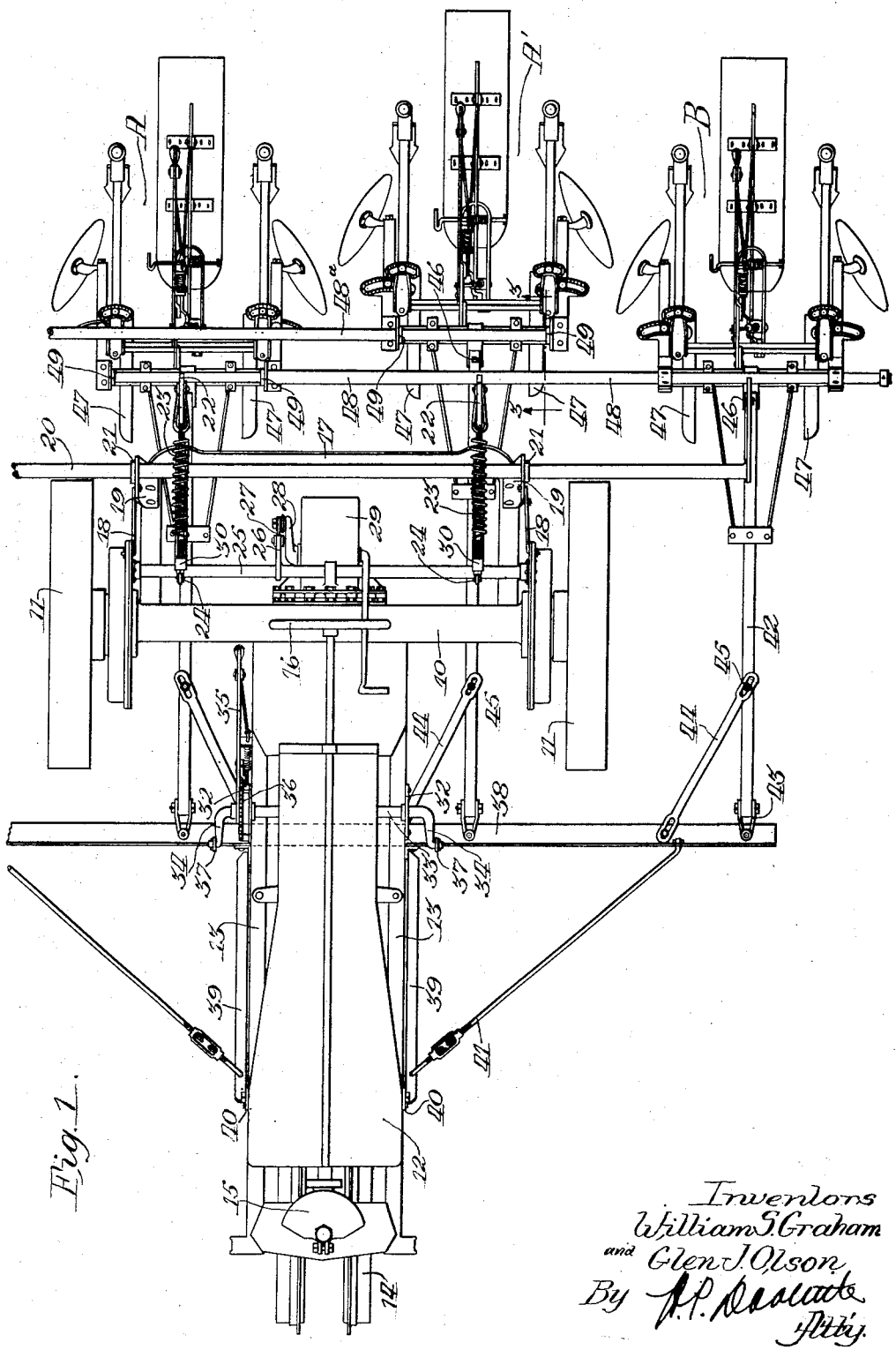
Figure 1 is a plan view of a row crop tractor and four row lister cultivator attachment embodying the invention, one outer unit of the cultivator being omitted for lack of space.

The invention is disclosed in an organization comprising a row crop tractor of a well known type consisting generally of a wide tread rear axle structure 10 supported on traction wheels 11, which are spaced to span two plant furrows. The tractor also includes the central narrow body 12 including side sills 13 supported at their forward ends on a dirigible truck 14, the upright shaft of which is connected through suitable gearing at 15 with the steering shaft and wheel 16 extending to the rear of the tractor. The tractor also includes a U-shaped rearwardly extending drawbar 17, which in the present instance is elevated to the position shown in Figure 2 and held in such position by suspension links 18 connected to the axle housing of the tractor and to brackets 19 on the arms of the drawbar. In this position, the drawbar is made to serve as a supporting frame for an elongated transverse shaft 20 extending at each side beyond the traction wheels 11. This shaft is rotatably mounted in bearings 21 in the brackets 19 and is provided with upwardly extending arms 22 adjacent each of these bearings, which arms are connected by links 23 to crank arms 24 fixed on a rockshaft 25 journaled in suitable bearings on the tractor. This rockshaft is connected by a crank arm 26 and link 27 to the rotatable arm 28 of a power lift mechanism enclosed in the housing 29 on the rear of the axle structure of the tractor.

At each actuation of the power lift mechanism, the shaft 25 will be oscillated alternately in opposite directions and these movements will be transmitted through the link 23 to the shaft 20. In order to assist the lift, springs 29 are preferably interposed between the outer end of the arms 22 and an upstanding lug 30 on the forward end of links 23. The shaft 20 is provided with four equally spaced, rearwardly extending lifting arms 31, the purpose of which will be later referred to.

Forwardly of the traction wheels, the side sill members 13 of the tractor have bearing brackets 32 clamped thereto, in which there is journaled a transversely extending crank shaft 33 provided with a crank arm 34 at each end. The shaft 33 carries a fixed, upwardly extending hand lever 35 cooperating with a rack 36, through which the shaft 33 may be oscillated to swing the crank arms up and down. Each crank arm 34 is pivotally connected to a suspension link 37, which carries an elongated, transverse draft bar 38. Forwardly and upwardly extending brace members 39 connect the suspension links 37 with suitable brackets 40 located forwardly on the tractor, and laterally extending brace rods 41 connect the outer portions of the member 38 with the forward portions of the brace bars 39. By this arrangement the transverse draft member 38 is held against fore and aft movement, but may be adjusted vertically through movements of the lever 35.

The transverse draft member 38 serves as the point of draft connection for four rearwardly extending draft links or tongues 42. These draft links are equally spaced corresponding to the spacing of the furrows, and are pivotally connected to the draft member 38 for both vertical and lateral movement, as by clevis members 43. In order to prevent excessive lateral movement of the draft links 42, an angularly extending stop bar 44 is provided, which is pivoted at its forward end to the draft member 38 and has a pin and slot connection 45 with an intermediate point on the draft link 42. The length of the slot determines the extent of lateral movement of the draft link 42.

Each of the draft links 32 is pivotally connected at its rear end on a vertical pivot at 46 to a unit of a four unit lister cultivator located immediately to the rear of the traction wheels of the tractor. The lister cultivator comprises four units made up of two pairs of interconnected units arranged in alternating or overlapping relation; that is to say, the units of each interconnected pair are spaced apart and have one unit of the other pair positioned in the space between them. Referring to Figure 1, it will be seen that the cultivator units are of conventional construction and comprise a frame structure having a pair of furrow guide and supporting wheels 47 and the usual cultivating tools and fenders connected to the frame. The frame of each unit also carries the usual hand levers for adjustment of the cultivating tools and fenders, respectively, as shown. As all the units are alike and are of well known type, their structure will not be further described, as novelty resides in the arrangement and manner of connection of the units rather than in the structure of the particular units. In the arrangement of this invention, each pair of units has its inner unit at A, located inside the tread line of one of the traction wheels, interconnected with its outer unit B located at the outside of the other traction wheel. The other inner unit A' is similarly connected to its companion outer unit at the opposite side of the tractor, so that the units of the two pairs alternate. The connection between each interconnected pair of units consists of a laterally extending guide bar 48 which is secured in upstanding brackets 49 on the unit A and has its intermediate portion spanning the space occupied by the inner unit of the opposite pair, its outer end being received in laterally spaced guide brackets 50 mounted on the frame of the outer unit B. A similar oppositely extending bar 48ᵃ connects the other pair of units. These guide members 48 and 48ᵃ are preferably cylindrical and are received on triple guide rollers 51 mounted within lateral loops of brackets 50, as shown in Figure 3. The outer units are, therefore, movable axially on the connecting bars; that is to say, the units of each pair may move towards and from each other as the guide bars slide or move through the brackets 50, but cannot tip or move out of parallel relation. The extent of this movement will be limited by the pendant slot connections at 45, which are so gauged as to prevent interference between the four units of the lister attachment.

As the inner portions of the guide members connecting the two pairs of units overlap, one of the pairs of units is offset from the other in a fore and aft direction, as seen on Figure 1.

In order to provide for a simultaneous lifting and lowering of all of the units, each of the arms 31 on the shaft 20 is connected to a unit by a flexible element or chain 52, and oscillation of the shaft 20 by the lift mechanism will raise or lower all of the units at once.

With the organization and details of construction above described, the lister units will operate on four plant furrows and each unit will be capable of independent lateral movement to a sufficient degree to permit it to follow deviations in the plant furrow, and the units will be so interconnected as to be held in transverse alignment in pairs and capable of lifting and lowering movement as one structure. It will also be possible to connect an implement of this type to a standard row crop tractor without any modification of the tractor structure and by making use of standard tractor parts.

The preferred structure illustrated may be varied without departure from the scope of the invention as defined in the following claims.

What is claimed is:

1. A four row lister cultivator comprising two pairs of interconnected furrow following units having the units of each pair arranged in transverse alignment and offset fore and aft from the other pair, the units of each pair being spaced apart and having one unit of the other pair positioned in said space, and a transverse bar connecting the units of each pair for a relative movement towards and from each other.

2. A four row lister cultivator comprising two pairs of interconnected furrow following units having the units of each pair arranged in transverse alignment and offset fore and aft from the other pair, the units of each pair being spaced apart and having one unit of the other pair positioned in said space, and a guiding connection between each pair of units comprising a bar secured at one end to one unit of the pair and slidably connected at its other end to the other unit thereof.

3. A four row lister cultivator comprising two pairs of interconnected furrow following units having the units of each pair arranged in transverse alignment and offset fore and aft from the other pair, the units of each pair being spaced apart and having one unit of the other pair positioned in said space, the connection between each pair of units consisting of a laterally extending bar secured at one end to the inner unit of one pair and having its other end mounted in laterally spaced bearings on the outer unit thereof for movement of said unit axially on the bar, and a draft connection for each unit including means for limiting movement of the units towards and away from one another.

4. In a lister cultivator, the combination with a tractor having rear traction wheels spaced to span two plant furrows, of two pairs of interconnected furrow following units connected with the tractor by draft means having free movement laterally and vertically, the units of each pair alternating with the units of the other pair and the respective units of each pair being disposed one inside and the other outside the tread lines of the respective traction wheels, a transversely extended bar connecting each pair of units, and lifting means on the tractor having connections with said units for lifting and lowering all in unison.

5. In a lister cvultivator, the combination with a tractor having rear traction wheels spaced to span two plant furrows, of two pairs of interconnected furrow following units connected with the tractor by draft means having free movement laterally and vertically, one unit of each pair being positioned to engage a plant furrow at the inner side of one traction wheel and the other unit being positioned to engage a furrow on the outer side of the other traction wheel, a laterally extending guide bar secured to the inner unit of each pair and slidably connected to the outer unit thereof, said bars being disposed in overlapped relation in the same horizontal plane, and lifting means on the tractor having connections with said units for lifting and lowering all in unison.

6. In a lister cultivator, the combination with a tractor having rear traction wheels spaced to span two plant furrows, of a transverse draft bar on the tractor forward of the traction wheels, two pairs of interconnected furrow following units located back of the traction wheels, a draft link pivotally connecting each unit with said draft bar, the units of each pair being disposed in transverse alignment with one unit positioned to engage a plant furrow at the inner side of one traction wheel and the other to engage a furrow at the outer side of the other traction wheel, a laterally extending guide bar secured to one unit of each pair and slidably connected to the other unit thereof, said bars being disposed in overlapped relation in the same hrizontal plane, and lifting means on the tractor having connections with said units for lifting and lowering all in unison.

WILLIAM S. GRAHAM.
GLEN J. OLSON.